(No Model.) 3 Sheets—Sheet 1.

W. J. STILL.
ELECTRIC MOTOR.

No. 517,668. Patented Apr. 3, 1894.

Witnesses.

Inventor.
W. J. Still
by Fetherstonhaugh & Co
Attys (No Model.) 3 Sheets—Sheet 2.

W. J. STILL.
ELECTRIC MOTOR.

No. 517,668. Patented Apr. 3, 1894.

Witnesses. Inventor.

(No Model.) 3 Sheets—Sheet 3.

W. J. STILL.
ELECTRIC MOTOR.

No. 517,668. Patented Apr. 3, 1894.

Witnesses. Inventor.

UNITED STATES PATENT OFFICE.

WILLIAM JOSEPH STILL, OF TORONTO, CANADA, ASSIGNOR OF ONE-HALF TO RANDOLPH MacDONALD, OF SAME PLACE.

ELECTRIC MOTOR.

SPECIFICATION forming part of Letters Patent No. 517,668, dated April 3, 1894.

Application filed March 3, 1893. Serial No. 464,541. (No model.) Patented in Canada July 11, 1893, No. 43,566.

*To all whom it may concern:*

Be it known that I, WILLIAM JOSEPH STILL, electrician, of the city of Toronto, in the county of York, in the Province of Ontario, Canada, have invented certain new and useful Improvements in Electric Motors, of which the following is a specification.

This invention has been patented to me in Canada under date July 11, 1893, No. 43,566.

My invention relates to improvements in electro-magnetic motors and the objects of the invention are; first, to so construct the armatures and magnets of a magnetic motor that the greatest possible magnetic pull derived from their coaction may be utilized, without being materially affected during their demagnetization, so as to increase the power and speed of the machine; secondly, to so construct the brushes that the sparking now commonly incident to the rapidity of short circuiting in brushes may be entirely done away with, and, thirdly, to provide an improved means whereby the eddy currents in the cores of the armatures or magnets may be reduced to a minimum and thereby facilitate an increased energy and speed of magnetic action of the armatures and it consists essentially, first, of providing at each side of the shaft of the machine upon a suitable frame arc-shaped magnets having secured to their ends arc-shaped plates, the ends of which extend above and below the ends of the magnet and are of peculiar form, and further in providing a series of arc-shaped armatures secured to a hub on the main driving shaft and so arranged that the ends of the armatures rotate substantially laterally parallel to the inner faces of the plates but describe a circle of greater radius so that they approach very close to the ends of the plate when passing the same and are farthest away from the plate when directly opposite the magnets; secondly, of forming the brushes of a central plate of conducting material of low resistance and locating on each side of the same, plates of conducting material of high resistance, which are designed to coact with the sections of the commutator in the manner hereinafter more particularly explained and, thirdly, of forming the core of the armatures of a bundle of wires insulated from each other and preferably twisted as hereinafter more particularly explained.

Figure 1:
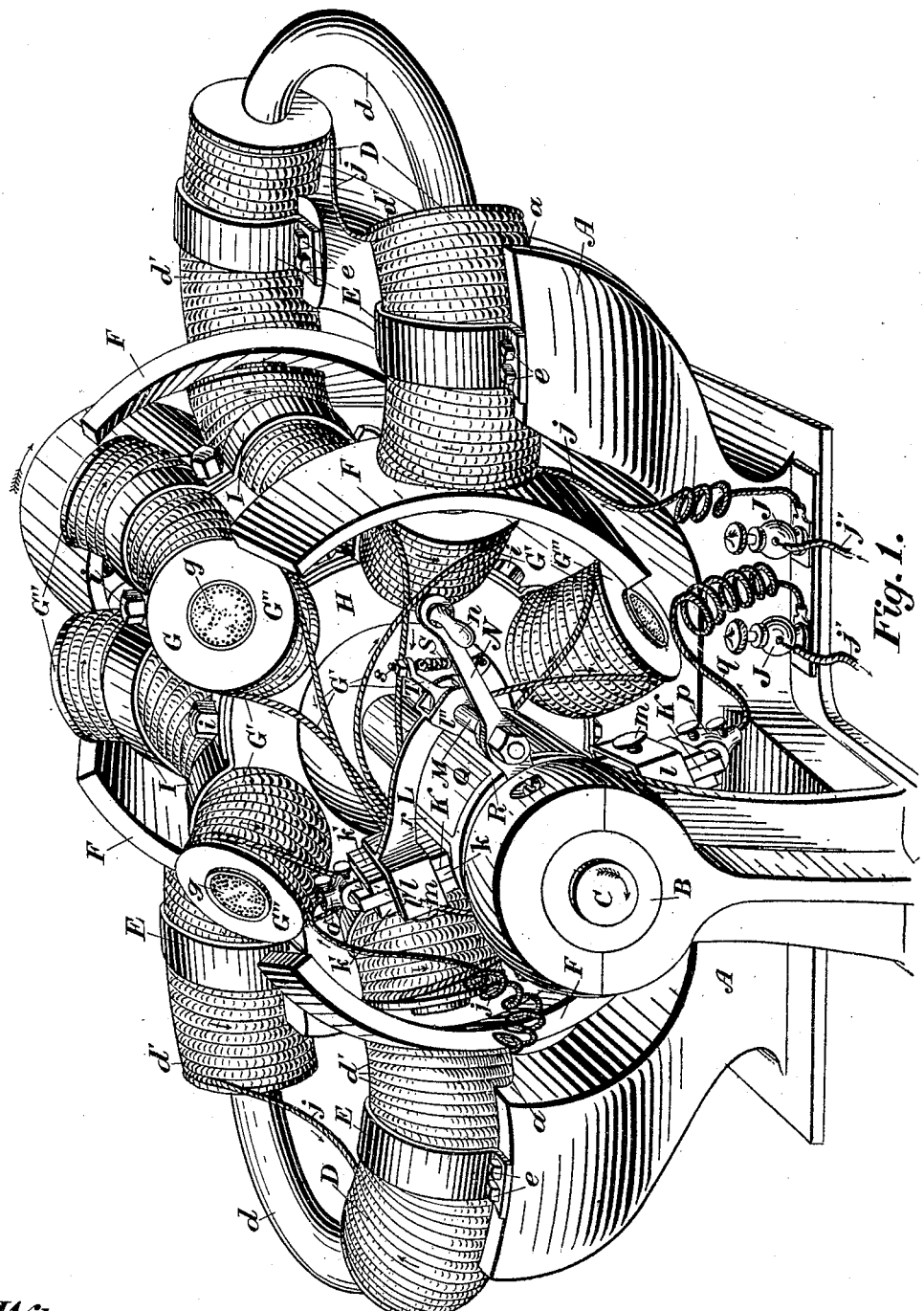
Figure 2:
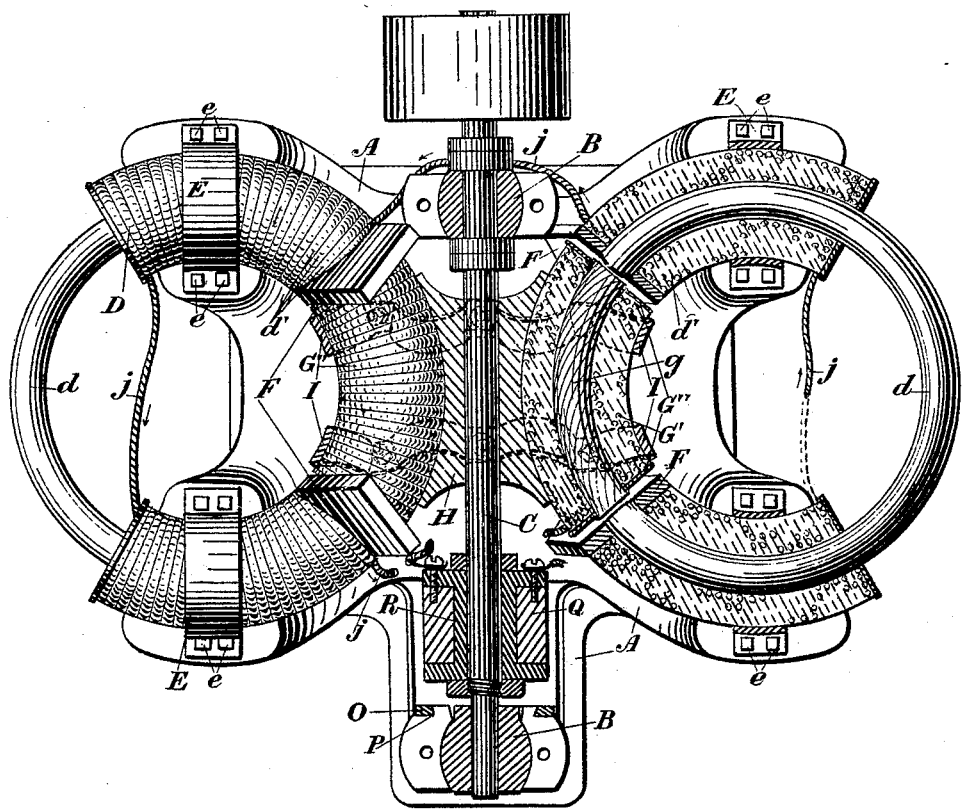
Figure 3:
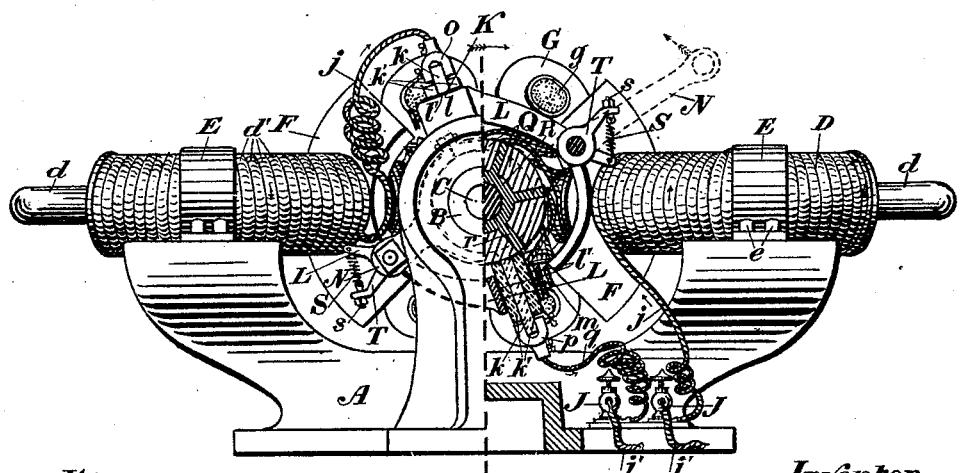
Figure 4:
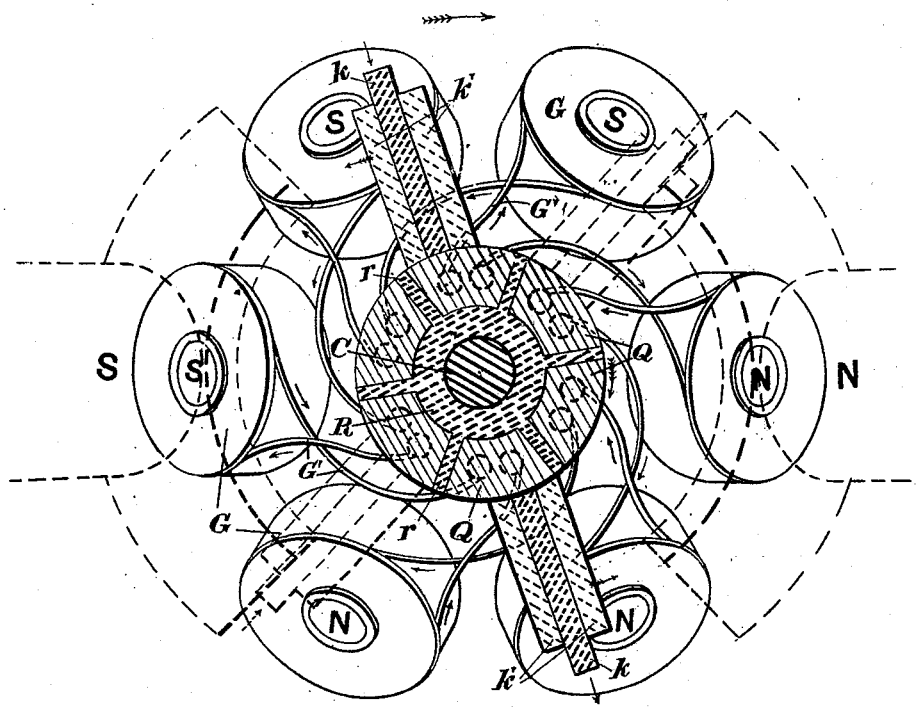
Figure 5:
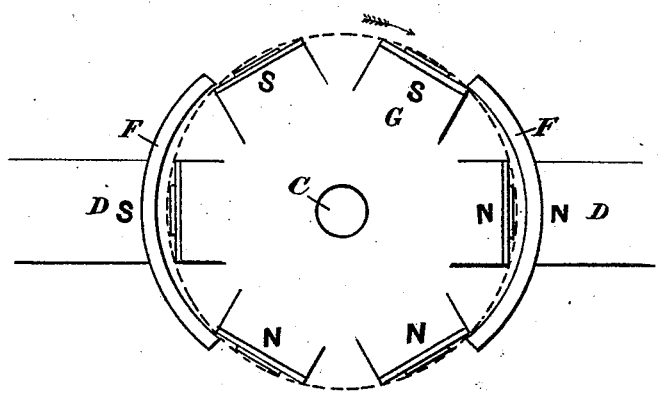

Figure 1, is a perspective view of my magnetic motor. Fig. 2, is a plan one half being top plan and the other half sectional. Fig. 3, is an elevation one half being an end elevation and the other half a sectional elevation through the commutator. Fig. 4, is an enlarged diagrammatic view showing the commutator and brushes in section and the general arrangement and connection of the wires from the armatures to the commutator. Fig. 5, is a diagrammatic view showing by dotted lines the circle described by the armatures in reference to the ends of the magnets.

In the drawings like letters of reference indicate corresponding parts in each figure.

A, is the frame of the machine, B, the end standards in which the main shaft, C, is journaled.

D, are arc-shaped magnets provided with a central arc-shaped core, $d$, of soft iron. The coils, $d'$, of the magnets, D, are preferably formed with heavy wire, such coils extending from the inner portions of the magnet outwardly, the remaining portion of the arc-shaped cores being preferably left without being wound. The magnets, D, are secured in the concave recess, $a$, in the top of the frame, A, by the metal strips, E, which are bolted to the top of the frame by bolts, $e$, as shown.

F, are curved iron plates secured to the end of the magnets D, and extending considerably above and below the coils, $d'$. The curved plates F, on the two ends of the magnets are substantially on a line with the two radii to the center of the circle from which the arc upon which the magnet is formed is described. In other words if the radii were produced to the axis of the shaft the angle formed inside such radii would be an acute angle and the ends of the magnets and plates would be substantially parallel to such radii. The curve of the plates, F, from top to bottom is the arc of a circle less in diameter than that described by the center of the ends of the armatures which I shall now describe.

G, are a series of armatures, the cores, $g$, of which have wound around them the armature coils, G'. The cores, $g$, are formed of a bundle of iron wires, which are insulated from each other by means of their natural oxide or by electro-plating with metals of high magnetic resistance. The end plates, G'', of the armatures G, are laterally parallel with the end plates of the magnets, D, and the end plates, F, of the magnets are so arranged that as the armatures, G, revolve they still are laterally parallel to the plates, F. The end plates, G'', are preferably formed of insulating material.

From what has been before described it will necessarily appear that as the curve upon which the plate, F, is constructed is the arc of a circle of less diameter than that described by the ends of the armature, that the ends of the armatures, G, as they pass the ends of the plates, F, are closer to such plates but gradually recede from the plates, F, as the ends of the armatures come opposite the center of the magnet and the distance is again diminished as the ends of the armature approach the opposite end of the plate where the armature, G, is the same distance away from that end of the plate as from the other end before described. The relative position above described of the plates, and armatures as they pass the plates, will be readily comprehended on reference to Fig. 5. The armatures, G, are arc-shaped as will appear on reference to the drawings, such arc-shaped armature completing the remaining arc of the circle, the other portion or arc of which is formed by the magnet, D. The armatures, G, are secured in concave recesses in the hub, H, by the metal strips, I, which curve where they pass over the armatures, so as to hold them securely in position, and are secured to the hub by the bolts, i. The manner in which the armatures are secured to the hub will be clearly understood on reference to Figs. 1 and 2.

J, J, are binding posts and, j', j', are the wires insulated in the usual manner which lead from the dynamo to the motor.

j, is the wire which runs through one divided coil of the magnet to the other thence to the divided coils of the opposite magnet whence it passes to the binding post of one of the brushes, K, which I shall now describe as also the commutator and the wiring running from the armatures to the ends of the commutator.

K, K, are the brushes, which are secured in the open ends, l, l, of the holding levers, L, L, by the set screws, m, m, and are insulated from the open ends, l, l, by plates, l', l'. Each of the brushes is composed of three plates the central plate, k, being preferably made of soft carbon or other conducting material of low resistance while the side plates, k', are made of hard carbon or other conducting material of a high resistance. The supporting levers, L, are pivoted on the ends of the spindles, M, which are secured in the arms, N, which are secured to or form part of the ring, O, fitting into the annular recess, P, made in the bearing, B. It will be seen that the upper arm extends outwardly and is provided with a handle, n, by which the brushes are changed from the position shown in full lines in Fig. 4 to the position shown in dotted lines in this figure so as to reverse the motor.

The commutator is constructed in the usual manner of metallic sections, Q, fitting into corresponding recesses in the insulating hub portion, R, the ends of which are formed of insulated material and the metallic sections being separated by the partition, r, as shown in Figs. 2, 3, and 4. The brushes are held against the commutator in the ordinary manner by tension springs S, which are connected at one end to the tail of the lever, L, and at the other by an adjustable bolt, s, to the arm, T, secured on the end of the spindle, M, within the open end, l'', of the lever, L. The terminal end of the wire, j, which runs through the coil, d', of the magnet, D, is secured to the binding post, o, at the outer end of the upper brush, K.

q, is a wire secured at one end to the binding post, p, of the lower brush and at the other end to the binding post, J.

On reference to Fig. 4, the method of wiring the armatures from the commutator will be understood. The coils of the cores of the armatures, G, are each wound from the wire, G', which starts from a binding post screwed into one metallic section, Q, of the commutator and ends in the binding post screwed into the next section of the commutator (see Fig. 4).

Having now described the principal parts involved in my invention I shall proceed to describe the operation and advantages arising from my construction of motor. When the brushes are set in the position indicated in Figs. 1, 3, and 4 it will be seen that the current passing along the wire, j, through the magnets, D, will pass through the upper brush in the direction indicated by arrow and will pass through various sections of the commutator to and from the coils of the armatures, G, along the wires, G', in the direction indicated by arrow and finally pass out through the lower brush (see Fig. 4). It will thus be seen that the two poles of the armatures shown at the top of the diagrammatic view in Fig. 4 will be south poles, the two shown at the bottom will be north poles, and the one at the right hand side will be a north pole and the one at the left hand side will be a south pole, the magnet at the right hand side of the figure being a north pole magnet and the one at the left hand side of the figure being a south pole magnet.

In Fig. 2, it will be readily understood that the opposite end of the armatures to that shown in Fig. 4, and also in Fig. 2, will be of an opposite polarity to that shown in Fig. 4. It will consequently be seen that the north pole of the magnets attracting the three south pole armatures and repelling the three north pole armatures and the south pole of the magnets attracting the three north pole armatures and repelling the three south pole armatures in each case that the shaft, C, will be caused to rotate in the direction indicated by arrow. It will be seen, however, that when the position of the brushes is changed to that shown in dotted lines in Fig. 4, the current will still pass in the same direction from the metallic sections of the commutator to, through and from the coils of the armatures on the right and left side of this figure but will pass to, through and from the coils of the armatures shown at the top of this figure in the opposite direction to that indicated by arrow on the wires leading to and from these coils and will also pass to, through and from the armatures located at the bottom of this figure in the opposite direction making the two at the top north poles and the two armatures at the bottom south poles so that the shaft, C, will be caused to rotate in the opposite direction to that indicated by arrow.

I shall, now proceed to describe the means whereby the armatures are short circuited gradually and without any danger whatsoever of sparking. As the commutator revolves in the direction indicated by arrow it will be seen that the current passing through the upper brush, K, will pass from the metallic section of the commutator immediately beneath the brush out on the wire, G', to the armature, G, and back to the section of the commutator on the left hand side of the figure. This passage of the current in the direction indicated will continue as the commutator revolves with the shaft until the insulating partition $r$, reaches the outer plate, $k'$, of the brush when it will be seen that the outer plate bridges the partition, $r$. The plate, $k'$, being of high resistance very little of the current will pass through it but it will still short circuit the magnet in a slight degree without preventing the major portion of the current going through the armature, G. As the partition passes from the plate of high resistance to the central plate of the brush which is carbon of a low resistance the circuit will be very gradually cut out from the armature until the central plate or carbon of low resistance entirely bridges the partition, $r$, when the circuit will be completely cut off from the armature. As the commutator still revolving brings the partition, $r$, to the plate, $k'$, on the opposite side of the plate, $k$, of the brush, the current will be gradually thrown upon the wire leading to the armature but will pass along such wire in the opposite direction to that before described, that is to say in the direction in which the current is shown passing along the wire, G', to and from the armature at the extreme right hand side of Fig. 4, thereby changing the polarity of the armature gradually as the partition, $r$, passes the end of the plate, $k'$. This action of the brush as to the commutator in short circuiting changing the direction of the current over the wire to and from the armature and thereby changing the polarity of the armature occurs as each armature and its corresponding section of the commutator passes each brush in its rotation. It will therefore be seen on account of the peculiar formation of the brush consisting of the central plate of low resistance and the side plates of high resistance that it will be impossible on account of the gradual lessening, short circuiting and gradual increase of the current to and from the armature for any sparking at the brush to occur.

I shall now describe the peculiar advantages arising from the construction of the end plate of the magnets referring particularly to the diagrammatic view shown in Fig. 5. We will suppose as before stated that the armatures are caused, in the manner before described, to rotate in the direction indicated by arrow. The armature designated, G, in this figure is nearly in the position in which it is short circuited by the brush. The energy of its south polarity will remain in a slight degree in the armature, G, as it rotates in the direction indicated by arrow. By the peculiar construction of the plate, F, as before described drawn from a less radius than the circle described by the armature it follows that as the outer ends of the plates, F, almost touch such circle described, there is a space left between the curve of the plate, F, and the arc of the circle described by the armature, which gradually increases from the ends of the plate to its center. Consequently when the armature reaches the end of the plate, F, and is short circuited as before described the energy derived from the south polarity now remaining in such magnet, is neutralized as the armature is rotating from the end of the plate to a position directly opposite the center of the magnet D, and is acquiring its opposite polarity, that is to say the space being gradually increased between the armature and the plate, F, the rotation of the armatures will not be affected as such gradually increasing space between the armature, G, and plate, F, prevents the north polarity of the magnet having a reflex attraction to the armature, G, which it otherwise would by reason of the slight amount of energy of south polarity which remains in the armature. It will now be seen in my motor that there will be no backward pull on the armature which is commonly the case in all motors of which I am aware. The plates, F, of course extend at equal distances below and above the magnet, D, so as to equalize the lines of force acting upon the armatures.

Another advantage derived from the peculiar construction of the plates, F, on the ends of the magnets as compared with other machines is that in other machines the armatures have to be short circuited before the most effective portion of the pull of the magnets is exercised upon the armature while in my machine the pole of the magnet is utilized until the armature comes close to the end of the magnet or plate, F, which of course forms part of the magnet, and the armature is thus short circuited and demagnetized as it passes to a position opposite the center of the magnet.

The advantage derived from the construction of the plate, F, as to the armatures applies to both poles or ends of each magnet and both poles or ends of each armature. From the peculiar construction of my armature shown it will be seen that double the power will be produced by a motor constructed of armatures and magnets as shown. I have also an advantage that in the armatures and magnets I have got an attraction of the core for the core, coil for the coil, and the core for the coil in both armature and magnet.

In all ordinary motors now in use of which I have any knowledge it is necessary in winding the armature and magnet to use very fine wire but in my motor coarse wire may be used as it is the ends of the armature and magnet which come opposite to each other and consequently it will be seen that there is great advantage obtained in a motor constructed as above described as there is positively no danger of the motor burning out.

In this specification I describe the cores of the armatures as formed of a bundle of fine wires and the cores of the magnets as made of solid iron but it will of course be understood that the object of constructing the cores of the armatures with a bundle of fine wires is as before described to prevent the eddy currents in such cores but it would neither be advisable nor advantageous to construct the cores of the magnets of fine wires as it is only in the armatures that the current is reversed and the polarity changed.

Although I describe in this specification the cores of the armatures composed of a bundle of twisted wires it will be seen that the bundle of wires might not be twisted but simply curved to correspond with the curve of the armature but I find in practice that I produce better results by twisting the wires. Again although I show the brush formed of one central section and two side sections it will be understood that in case the motor is designed to rotate in the one direction only the brush may be comprised of only one plate of conducting material of low resistance and one plate of conducting material of high resistance insulated from the holder, such conducting plate of high resistance being behind the conducting plate of low resistance as to the direction of rotation.

Among the advantages arising from my construction of motor I might mention that the armatures are located so as to be in the direct path of the lines of force which pass between the ends of the magnets.

Again I wish to lay particular stress on the fact that in my motor each armature is always in circuit as it passes from one magnet to the other except during the short period in which demagnetization takes place. The advantage of this cannot be overestimated as the armatures being magnetized the pull of the magnet is constant and much more effective than if the armature was magnetized only by the lines of force of the pulling magnet. By the construction above described it will be seen that as the current is thrown into the armature immediately after it is demagnetized and leaves the center of the magnet, thereby magnetizing it, the pull of the opposite magnet is at once exerted. By my construction of motor it will be seen that I obtain a pull of a magnet to a magnet and not a magnet to an unmagnetized body.

What I claim as my invention is—

1. In an electro-magnetic motor, the combination with the arc-shaped magnets of the curved arc-shaped armatures each of which successively completes the arc of the circle of the said magnets as it rotates, the polar faces of the field magnets and armatures being so formed as to be substantially parallel, substantially as described.

2. In an electro-magnetic motor the combination with the arc-shaped magnets having the curved end plates extending above and below the coils of the magnets, of the arc-shaped armatures secured on the hub attached to the shaft of the machine, the ends of such armatures being constructed so that they rotate laterally parallel to the plates the concave sides of which plates are located next the shaft and the curve of the plate described from a radius less in diameter than the circle described by the ends of the armatures in their rotation so that the ends of the plates are nearer to the armature and the central portion farther away as the armature rotates as and for the purpose specified.

3. The combination with the arc-shaped magnets, D, secured in the concave recess, $a$, in the top of the frame, A, by metal straps, E, and having the end plates, F, constructed as specified, of the arc-shaped armatures, G, secured in the concave recesses in the hub, H, by the metal straps, I, the said armatures being constructed as specified and means whereby the current is conveyed to the coils of the magnets and armatures as and for the purpose specified.

4. The combination of the arc-shaped magnets, D, constructed as specified, and having the solid soft iron core, $d$, of the arc-shaped armatures, G, constructed as specified and having the core, $g$, formed of a bundle of twisted insulated wires and means whereby the current is conveyed to the coils of the magnets and armatures as and for the purpose specified.

5. In an electro magnetic motor, the combination with the commutator having metallic sections insulated from each other of the brush therefor consisting of a central conducting plate of a carbon of low resistance for conveying the current and the side plates of carbons of high resistance inclosing said conducting plate and adapted to increase the resistance as the metallic sections of the commutator recede from the central plate whereby a gradual break in the current is formed, substantially as described.

6. In an electric motor the combination with the magnets, armatures and commutator formed of metallic sections and insulating partition between the sections, of the brushes formed as specified and insulated from the holder by the insulating plates, $l'$, $l'$, as and for the purpose specified.

WILLIAM JOSEPH STILL.

Witnesses:
B. BOYD,
H. H. YOUNG.